United States Patent Office
3,657,321
Patented Apr. 18, 1972

3,657,321
4,4'-ALKYLIDENE-DIPHENOL-BIS-(DI-t-BUTYL-4'''-HYDROXYPHENYL) ALKANOATES
David Herbert Steinberg, Bronx, Martin Dexter, Briarcliff Manor, and John D. Spivack, Spring Valley, N.Y., assignors to Ciba-Geigy Corporation, Ardsley, N.Y.
No Drawing. Filed Apr. 30, 1969, Ser. No. 820,645
Int. Cl. C07c 69/76; C08f 45/58
U.S. Cl. 260—473 S  4 Claims

ABSTRACT OF THE DISCLOSURE

Novel hydroxyalkylarylalkanoates and hydroxyalkylbenzoates are provided by a procedure involving reacting a suitable diphenol or a dihydroxybenzene with a hydroxyalkylarylalkanoyl halide or hydroxyalkylbenzoyl halide. The hydroxyalkylarylalkanoate and hydroxyalkylbenzoate products are useful as stabilizers of organic materials which are subject to oxidative deterioration.

FIELD OF THE INVENTION

This invention relates to novel antioxidants for organic materials and particularly relates to hydroxyalkylarylalkanoates and benzoates. These compounds have been found to be useful as stabilizers of organic materials and generally, by including the novel antioxidants in organic materials or contacting the organic materials with the aforementioned antioxidants, the organic materials are protected against oxidative deterioration.

SUMMARY OF THE INVENTION

The novel hydroxyalkylarylalkanoates and hydroxyalkylbenzoates of the present invention have been found to be useful as stabilizers of organic materials which are subject to oxidative deterioration.

The new and useful compounds of the present invention are obtained by a procedure involving the reaction of a suitable diphenol or a dihydroxybenzene with a hydroxyalkylarylalkanoyl halide or hydroxyalkylbenzoyl halide.

The antioxidant compounds of the present invention are either incorporated in the organic material or brought into contact with said organic material and as a result, the organic material is protected against oxidative deterioration. The prevention of oxidation of various organic materials is obviously of primary industrial concern and the novel antioxidant compounds of the present invention are used to prevent oxidative deterioration of a wide variety of commercial products such as synthetic polymers, oils, plastics, and the like.

PREFERRED EMBODIMENTS OF THE INVENTION

The novel hydroxyalkylarylalkanoates and hydroxyalkylbenzoates of the present invention are represented by the formulae:

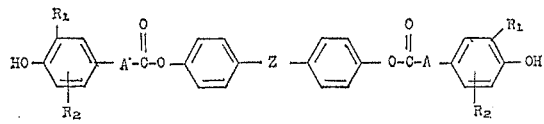

wherein:

$R_1$ is lower alkyl,
$R_2$ is hydrogen, lower alkyl or cycloalkyl
A is an alkylene group having from 1 to 6 carbon atoms, or a covalent bond, and
Z is a covalent bond or a bridging group that is O, S, SO, $SO_2$ or an alkylene group, with the proviso that when A is a covalent bond, Z is a hetero-atom or group such as O, S, SO or $SO_2$, and

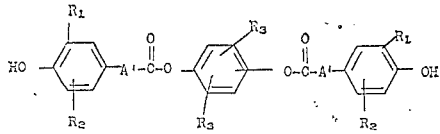

wherein $R_1$ and $R_2$ are as defined above and $R_3$ is hydrogen or lower alkyl and A' is an alkylene group containing from 1 to 6 carbon atoms.

Lower alkyl is intended to cover groups containing from 1 to 6 carbon atoms and illustratively, methyl, ethyl, propyl, isopropyl, butyl, hexyl, and the like; cycloalkyl is intended to cover groups containing from 5 to 8 carbon atoms and illustratively, cyclopentyl, cyclohexyl, and the like; alkylene is intended to cover groups containing from 1 to 6 carbon atoms and illustratively, methylene, ethylene, hexylene, and the like; and alkylidene is intended to cover a di-alkyl methylene group wherein the alkyl group contains from 1 to 6 carbon atoms.

The novel hydroxyalkylarylalkanoates and benzoates of the present invention are prepared by a procedure involving the reaction between a diphenol or a dihydroxybenzene and a hydroxyalkylalkanoyl halide or benzoyl halide. The diaryl phenol starting material can, as indicated above, be bridged by an O, S, SO, $SO_2$ or alkylidene group and said diaryl phenol can be represented by the following formula:

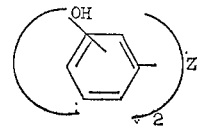

wherein Z is defined above. The alternative starting material, i.e., the dihydroxybenzene, can be represented by the formula:

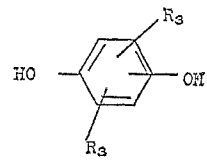

wherein $R_3$ is defined above.

The hydroxyalkyl aryl alkanoyl halides and benzoyl halide can be represented by the following formula:

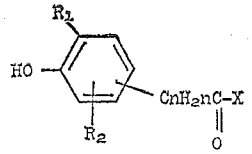

wherein:

$R_1$ and $R_2$ are as defined above
X is a halogen atom such as Cl, Br, I and F and
n is a number from 0 to 6.

The reaction between the dephenol or dihydroxybenzene and the hydroxyalkyl aryl alkanoyl halide or benzoyl halide is usually carried out in the presence of a solvent. Suitable solvents include non-reactive or chemically inert solvents and illustratively, pyridine, chloroform, dioxane and the like.

Since one of the starting materials is an acid halide, a hydrogen halide is liberated and consequently, the reaction can be conducted in the presence of an acid acceptor such as, for example, triethylamine, sodium hydroxide, potassium hydroxide, sodium carbonate, and the like. When an acid acceptor is employed, the reaction can be conducted at temperatures ranging from about room temperature up to about 50° C. The reaction can however be suitably conducted at about room temperature. However, when no acid acceptor is included in the reaction medium, the reaction is conducted at a higher temperature that is, at a temperature up to about 175° C.

In the reaction, generally about 2 moles of the starting acid chloride are used for about each mole of the starting diphenol compound. Suitably, a slight excess of the acid chloride starting material is used and good results are obtained when about 20% excess of the starting acid chloride reactant.

In one typical reaction, a hydroxyalkylarylalkanoyl halide such as 3-(3′,5′-di-t-butyl-4′-hydroxyphenyl) propionyl chloride is reacted at a temperature of about 150° C. with a diphenol such as p,p′-isopropylidenediphenol in a molar ratio of about 2 to slightly more than 2 to 1. The desired product that is, 4,4′-isopropylidenediphenol-bis [3″-(3‴,5‴-di-t-butyl-4‴-hydroxyphenyl)propionate] is obtained, in crystalline form and in a high yield.

The following examples detail the nature of the present invention and are therefore to be considered as illustrative but not limiting the invention.

EXAMPLE I

A dry reaction vessel is charged with 34.3 g. (0.15 mole) of p,p′-isopropylidenediphenol (bisphenol A), 93.1 g. (0.314 mole) of 3-(3′,5′-di-t-butyl-4′-hydroxyphenyl) propionyl chloride and 1.5 liters of Amsco 46 (an inert reaction solvent comprising a petroleum fraction boiling between about 150° and 200° C.). While stirring and introducing a moderate flow of nitrogen above the surface of the reacting mixture, the system is heated under reflux (about 150° C.) for about 3 hours. On cooling and stirring the reaction mass, there is obtained 98.1 g. of the crystalline product, 4,4′ - isopropylidenediphenol-bis[3″-(3‴,5‴-di-t-butyl-4‴-hydroxyphenyl)propionate], characterized by a melting point of 171–3° C.

*Analysis.*—Calculated for $C_{49}H_{64}O_6$ (percent): C, 78.57; H, 8.61. Found (percent): C, 78.61; H, 8.53.

EXAMPLE II

A solution consisting of 5.05 g. (.025 mole) 4,4′-dihydroxydiphenyl ether in 100 ml. of dry pyridine is placed in a dry apparatus, stirred and cooled to 0–5° C. and 14.8 g. (0.055 mole) of 3,5-di-t-butyl-4-hydroxybenzoyl chloride is added over 30–60 minutes. The reaction mixture is allowed to warm to ambient temperature while stirring overnight. The mixture is then heated at 40° for an additional 3 hours. After cooling, the reaction is quenched by pouring into cold water and extracting the product with ether. Removal of the solvent leaves 18.6 g. of crude product, 4,4′-dihydroxydiphenyl ether bis(3″,5″-di-t-butyl-4-hydroxybenzoate) as a yellow glass.

The aforesaid product is purified by dissolving in benzene, filtering through a bed of alumina, stripping the benzene and crystallizing the resulting residue from cyclohexane. After drying, the product has a melting point of 211–214° C.

*Analysis.*—Calculated for $C_{42}H_{50}O_7$ (percent): C, 75.64; H, 7.56. Found (percent): C, 57.89; H, 7.77.

EXAMPLE III

A solution consisting of 5.01 g. (0.020 mole) 4,4′-dihydroxydiphenyl sulfone in 100 ml. of dry pyridine is placed in a dry apparatus, stirred and cooled to 0–5° C. 11.8 g. (0.044 mole) of 3,5-di-t-butyl-4-hydroxybenzoyl chloride is added over a 1 hour interval. The reaction mixture is allowed to reach room temperature after 2 hours, then stirred for 24 hours at this temperature. The mixture is then heated for 1 hour at 45° C. After cooling, the reaction is quenched by pouring into cold water and extracting the product with ether. Removal of the solvent leaves 14.5 g. of crude product, 4,4-dihydroxydiphenyl sulfone bis(3″,5″-di-t-butyl-4″-hydroxybenzoate).

Purification is achieved by passing a benzene solution of the crude product through a bed of silica gel. Removal of the solvent, followed by crystallization of the residue from ether affords the product as a white solid having a melting point of 162–5° C.

*Analysis.*—Calculated for $C_{42}H_{50}O_8S$ (percent): C, 70.56; H, 7.05; S, 4.48. Found (percent): C, 70.38; H, 7.15; S, 4.37.

Similarly, following the general procedure set out above, the following hydroxyalkylarylalkanoates are obtained:

4,4′-isopropylidenediphenol bis[3″-(3‴-cyclohexyl-4‴-hydroxyphenyl)]propionate
4,4′-isopropylidenediphenol bis[3″-(3‴-isopropyl-4‴-hydroxyphenyl)]propionate
4,4′-methylenediphenol bis[3″-(3‴-cyclohexyl-4‴-hydroxyphenyl)]butanoate
2,4-bis(3′-t-butyl-4′-hydroxyphenylacetoxy)-ethylbenzene.

The compounds of the present invention are useful as stabilizers of organic materials normally subject to oxidative deterioration and such organic materials include: synthetic organic polymeric substances such as vinyl resins formed from the polymerization of vinyl halides or from the copolymerization of vinyl halides with unsaturated polymerizable compounds, e.g., vinyl esters, α,β-unsaturated aldehydes and unsaturated hydrocarbons such as butadienes and styrene; polyolefins such as polyethylene, polypropylene, polyisoprene, and the like, including copolymers of poly-α-olefins, polyurethanes and polyamides such as polyhexamethylene adipamide and polycaprolactam; polyesters such as polymethylene terephthalates; polycarbonates; polyacetals; polystyrene; polyethyleneoxide; and copolymers such as those of high impact polystyrene containing copolymers of butadiene and styrene and those formed by the coplymerization of acrylonitrile, butadiene and/or styrene. Other materials which can be stabilized by the active compounds of the present invention include lubrication oil of the aliphatic ester type, i.e., di(2-ethylhexyl)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like, hydrocarbon materials such as gasoline, mineral oil, fuel oil, drying oil, cutting fluids, waxes, resins, and the like; fatty acids, soaps, and the like.

In general, at least one, or more of the stabilizers of the present invention are employed in amounts, in toto, of from about 0.005 to about 5% by weight of the composition containing the organic material. A particularly advantageous range of the present stabilizers for polyolefins such as polypropylene is from about 0.05% to about 2%.

The stabilizers employed in this invention may be used alone or in combination with other stabilizers or additive materials. Expecially useful in certain cases in the stabilizer di-lauryl-β-thiodipropionate. Special mention is made of di-stearyl-β-thiodipropionate.

Furthermore, compounds of the formula:

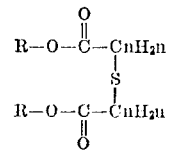

wherein:

R is an alkyl group having from 6 to 24 carbon atoms; and n is an integer from 1 to 6.

are useful stabilizers in combination with the novel antioxidant compounds of the present invention.

Other antioxidants, antiozonants, thermal stabilizers, ultraviolet light absorbers, coloring materials, dyes, pigments, metal chelating agents, etc. may also be used in the compositions of the invention.

EXAMPLE IV

Since the oxidation of organic materials is slow at ambient temperatures, even in the absence of antioxidants, the testing of the effects of antioxidants must be conducted at high temperatures in order to obtain results within a convenient time. The tests conducted on the following material were made following oven aging in a tubular oven, with an air flow of 400' per minute at a temperature of 150° C.

The procedure used involved thoroughly blending unstabilized polypropylene powder (Hercules Profax 6501) with 0.25% by weight of 4,4'-isopropylidenediphenol-bis-[3''-(3''',5'''-di - t - butyl-4'''-hydroxyphenyl)propionate]. The blended material was then milled on a two-roller mill at 182° C., for ten minutes, after which time the stabilized polypropylene was sheeted from the mill and allowed to cool.

The milled polypropylene sheet was then cut into pieces and pressed for seven minutes on a hydraulic press at 218° C. and 2,000 pounds per square inch pressure. The resultant sheet of 25 mil thickness was tested for resistance to accelerated aging in a forced draft oven at 150° C. The results are set out in Table I below.

TABLE I

| Additives(s) | Oven aging at 150° C., hours to fail | Gardner color,[1] 0, 100, F |
|---|---|---|
| 4,4'-isopropylidenediphenol-bis-[3''-(3''',5'''-di-t-butyl-4'''-hydroxyphenyl) propionate] (0.25%)+0.5 Tinuvin 327 [2] | 1,190 | 1, 1, 3 |
| 4,4-isopropylidenediphenol-bis-[3''-(3''',5'''-di-t-butyl-4''' hydroxyphenyl) propionate] (0.1%)+0.3 DSTDP [3] | 1,693 | 1, 1, 1.5 |

[1] Represented in hours i.e., 0 hours, 100 hours and at F (failure) that is, after 1190 and 1693 hours, respectively.
[2] An ultraviolet stabilizer (a registered trademark).
[3] Distearylthiopropionate (a synergist for phenolic antioxidants).

NOTE.—The retention of color is also significantly maintained upon addition of the indicated stabilizer.

However, on subjecting the polypropylene per se (without the addition of stabilizer) to oven aging, failure occurred in only 3 hours. These comparison results clearly indicate the significant increase in the stabilization of polypropylene upon addition of an antioxidant of the present invention.

It should also be mentioned that phosphite esters may also be used in stabilized formulations containing the novel antioxidants of the present invention and such phosphite compounds include dialkyl phosphites such as, for example, distearylphosphite, dilaurylphosphite, and the like; trialkylphosphites such as, for example, trilaurylphosphite, triethylhexylphosphite, and the like; and trialkarylphosphites such as, for example, trinonylphenylphosphites, and the like.

EXAMPLE V

Stabilized rubber is prepared by mixing in the cold:

| | Parts |
|---|---|
| Havea latex crepe | 100 |
| Stearic acid | 1.5 |
| Zinc oxide | 5.0 |
| Diphenylguanidine | 1.0 |
| Sulfur | 2.5 |
| 4,4'-isopropylidenediphenol-bis-[3''-(3''',5''' - di - t - butyl-4'''-hydroxyphenyl)propionate] | 1.0 |

The resultant mixture is vulcanized at 140° C. and tested according to ASTM D–1206–52T. It is found that the time required to elongate a test strip from 120 mm. to 179 mm. is considerably shorter for the unstabilized rubber as compared with the stabilized rubber. Similarly styrene-butadiene rubber as well as a blend of natural rubber (50 parts) and polybutadiene rubber (50 parts) are noticeably stabilized by the addition of the above antioxidant compound.

EXAMPLE VI

High impact polystyrene resin containing elastomer (i.e., butadiene-styrene) is stabilized against loss of elongation properties by incorporation of 0.5% by weight of 4,4'-isopropylidenediphenol-bis-[3''-(3''',5'''-di-t-butyl-4'''-hydroxyphenyl)propionate]. Under the test conditions described below, the stabilized resin retains a higher percentage of its original elongation properties, whereas the unstabilized resin retains lessened elongation properties.

The unstabilized resin is dissolved in chloroform and the stabilizer then added, after which the mixture is cast on a glass plate the solvent evaporated to yield a uniform film which, upon drying, is removed and cut up, and then pressed for 7 minutes at a temperature of 163° C. and a pressure of 2,000 pounds per square inch into a sheet of uniform thickness (25 mil). The sheets are then cut into strips, approximately 4 x 0.5 inches. A portion of these strips is then measured for length of elongation in the Instron Tensile Tester (Instron Engineering Corporation, Quincy, Mass.). The remaining portion of the strips is aged in a forced draft oven for six weeks at 75° C. and thereafter tested for elongation.

EXAMPLE VII

When a 125 mil sample containing, in the first instance, no antioxidant and in the second instance, 4,4'-isopropylidenediphenol - bis-[3'',(3''',5''' - di-t-butyl-4'''-hydroxyphenyl)propionate], was added to a polyacetal resin containing an acid scavenger (dicyandiamide), it was noted that the weight loss at 230° C. after 45 minutes (simulating processing conditions) was 5.8% for the control (the sample containing no antioxidant) but only 1.57% for the sample containing the aforesaid stabilizer. The weight on heating was significantly minimized upon the addition of the stabilizer of the present invention.

EXAMPLE VIII

Upon the addition of the antioxidant 4,4'-isopropylidene-diphenol-bis - [3'' - (3''',5'''-di-t-butyl-4''' hydroxyphenyl) propionate] to a styrene-butadiene rubber and subjecting the sample to a temperature of 132° C. embritlement was noted after 168 hours. However, on subjecting to the same temperature, the styrene-butadiene rubber, without stabilizer, embrittlement was noted in less than 40 hours. There was also noted a substantial improvement in color stability in the sample containing the aforementioned stabilizer, as compared with the blank or control which did not contain any stabilizer.

The invention has been described with respect to certain preferred embodiments and various modifications and variations thereof will become obvious to persons skilled in the art. It is therefore to be understood that such modification and variations are to be included within the spirit and scope of this invention.

We claim:
1. Hydroxyalkyl aryl alkanoate compounds of the formulas:

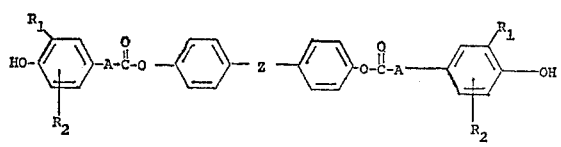

wherein $R_1$ is lower alkyl,
$R_2$ is hydrogen, lower alkyl or cycloalkyl having 5 to 8 carbon atoms
A is an alkylene group having from 1 to 6 carbon atoms, and
Z is a di-alkyl methylene group said alkyl groups containing 1 to 6 carbon atoms.

2. A compound according to claim 1 wherein $R_1$ and $R_2$ are tertiary alkyl groups.

3. A compound according to claim 1 wherein the hydroxyalkyl aryl alkanoate is 4,4'-isopropylidenediphenol-bis[3'' - (3''',5''' - di-t-butyl - 4'''-hydroxyphenyl)propionate].

4. A compound according to claim 1 wherein $R_1$ and $R_2$ are tert-butyl groups both in ortho positions to the hydroxyl group.

References Cited

UNITED STATES PATENTS 3,422,059   1/1969   Taylor et al. -------- 260—473

LORRAINE A. WEINBERGER, Primary Examiner

J. F. TERAPANE, Assistant Examiner

U.S. Cl. X.R.

260—45.85, 810; 99—163

GC 380

UNITED STATES PATENT OFFICE
CERTIFICATE OF CORRECTION

Patent No. 3,657,321      Dated April 18, 1972

Inventor(s) David Herbert Steinberg, Martin Dexter and John D. Spivack

It is certified that error appears in the above-identified patent and that said Letters Patent are hereby corrected as shown below:

Column 3, line 61, "57.89" should read "75.89".

Column 5, Table I, line 35 "1" should read "2".

Column 5, Table I, line 37, "2" should read "1".

Signed and sealed this 15th day of May 1973.

(SEAL)
Attest:

EDWARD M. FLETCHER, JR.       ROBERT GOTTSCHALK
Attesting Officer      Commissioner of Patents